(12) United States Patent
Narayanaswami et al.

(10) Patent No.: US 6,504,571 B1
(45) Date of Patent: Jan. 7, 2003

(54) SYSTEM AND METHODS FOR QUERYING DIGITAL IMAGE ARCHIVES USING RECORDED PARAMETERS

(75) Inventors: Chandrasekhar Narayanaswami, Wilton, CT (US); Edward Scott Kirkpatrick, Croton-On-Hudson, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/080,537

(22) Filed: May 18, 1998

(51) Int. Cl.$^7$ ............................ H04N 5/76; G01C 21/00
(52) U.S. Cl. ................... 348/231.99; 701/207
(58) Field of Search ..................... 348/231, 232, 348/144, 231.99, 231.6; 701/207, 208, 209, 213

(56) References Cited

U.S. PATENT DOCUMENTS

| | | | |
|---|---|---|---|
| 4,574,319 A | | 3/1986 | Konishi |
| 5,247,356 A | | 9/1993 | Ciampa |
| 5,499,294 A | | 3/1996 | Friedman |
| 5,506,644 A | | 4/1996 | Suzuki et al. |
| 5,517,419 A | | 5/1996 | Lanckton et al. |
| 5,530,759 A | | 6/1996 | Braudaway et al. |
| 5,596,494 A | | 1/1997 | Kuo |
| 5,926,116 A | * | 7/1999 | Kitano et al. ............... 340/988 |
| 6,104,316 A | * | 8/2000 | Behr et al. .................. 701/208 |
| 6,138,072 A | * | 10/2000 | Nagai ......................... 701/207 |
| 6,314,369 B1 | * | 11/2001 | Ito et al. ..................... 701/209 |
| 6,336,073 B1 | * | 1/2002 | Ihara et al. ................. 701/202 |

FOREIGN PATENT DOCUMENTS

| | | |
|---|---|---|
| EP | 747670 A2 | 12/1996 |
| JP | 08335034 | 12/1996 |
| JP | 10011084 | 1/1998 |
| WO | WO 9718440 | 5/1997 |
| WO | 9718440 * | 5/1997 |
| WO | WO 9748065 | 12/1997 |

* cited by examiner

*Primary Examiner*—Wendy R. Garber
*Assistant Examiner*—Rashawn N. Tillery
(74) *Attorney, Agent, or Firm*—F. Chau & Associates, LLP; Robert M. Trepp

(57) ABSTRACT

System and methods for querying digital image archives containing digital photographs and/or videos (collectively, "digital images"). The digital images are indexed in accordance with a plurality of recorded parameters including time, date and geographic location data (altitude and longitude), as well as image data such as lens focal length, auto focus distance, shutter speed, exposure duration, aperture setting, frame number, image quality, flash status and light meter readings, which are used for searching a database consisting of the digital images. These images are preferably generated by an image capturing system which is capable of measuring and recording a plurality of parameters with each captured digital image. The image retrieval system allows a querying user to search the image archive by formulating one or more of a plurality of query types which are based on the recorded parameters, and then retrieve and display those images having the specified parameters.

19 Claims, 3 Drawing Sheets

SYSTEM AND METHODS FOR QUERYING DIGITAL IMAGE ARCHIVES USING RECORDED PARAMETERS

BACKGROUND OF THE INVENTION

1. Technical Field of the Invention

This invention relates generally to system and methods for querying multimedia databases and, more particularly, to a system for generating digital images (stills and video) having various parameters recorded thereon, and system and methods for querying digital image (stills and video) archives by searching the recorded parameters, and for providing geographically visual user-requested directions.

2. Description of the Related Art

In general, owners of multimedia archives are continuously seeking to improve the management and search capabilities of their archives in order to make it easier for users of such archives to retrieve desired information. In particular, it would be useful to be able to query a multimedia archive comprised of digital images (e.g., photographs or video sequences) by specifying certain parameters which are recorded on the digital images such as names of geographic locations, altitude, longitude, time and/or date, and searching the contents of the archive to retrieve every digital image having the specified parameters. By way of example, in order to relive the experience of escaping a cold winter in the northeast USA, a person may retrieve every picture and/or video clip that was taken during their trip to Daytona Beach. This may be accomplished, for example, by generating a query which searches for digital stills and/or video (collectively, "digital images") having particular geographic data recorded thereon which falls within a specified geographic boundary associated with Daytona Beach.

There are various commercially available software application programs which can be utilized for creating, manipulating and redistributing digital photo albums (i.e., digital image archives). A few of these programs provide a user with limited image search capabilities. For instance, although several programs allow a user to search for particular images by date, the date refers to the date on which the image file was last modified and not the date on which the image was taken. Furthermore, there are no commercially available programs which allow a user to search for images by specifying a range of dates or range of time. Several of these programs allow a user to search images by color and/or texture, and can retrieve images that match a template image. Further, several of these programs allow a user to search images by file size, which has a limited value. In addition, several of these programs can sort images by date, file name, etc. A few have support to publish HTML web pages on the Internet and to e-mail them. In addition, there are no image album applications currently available which provide geographic search capability, e.g., none provide the capability to search-by parameters such as latitude, longitude, region and/or geographic location.

There is a need, therefore, in the industry to provide a digital image database query system which can search for digital images based on parameters such as geographic location, time and date. Moreover, a database query system having an image search program which uses such parameters, as well as additional parameters (e.g., camera parameters such as shutter speed, flash status, auto focus distance, light meter readings, focal length and aperture), would be even more useful for searching and retrieving images in a digital image archive having the recorded parameters. Indeed, such a system could automatically provide various details regarding the creation of the digital image, and would be of significant value to multimedia database search systems, as well as map and atlas makers, insurance agencies (e.g., real-estate, auto, and fire), hospitals, news agencies and crime investigating agencies.

Furthermore, a device that can automatically incorporate (i.e., record) user-specified parameters (such as latitude, longitude, time and data, as well as any other recordable parameters which may be unique to a particular image recording device such as a digital camera) onto a digital image would be a significantly valuable tool for facilitating the creation of digital image archives which can be utilized with image search systems based on such parameters. There is no device or system currently available that automatically records an adequate amount of parameters with each captured image or video such that the image or video can be sufficiently indexed so as to provide efficient image search and retrieval methods based on such parameters.

For instance, there are commercially available digital cameras which can record the time and date with each image, but recording only time and date with each captured image provides an insufficient number of parameters with which to index digital images for purposes of efficient database querying. There are commercially available film cameras which are capable of recording the time and date on each photographic image as well as additional parameters, but these devices do not record the additional camera parameters in an electronically accessible or searchable form. For example, U.S. Pat. No. 4,574,319 to M. Konishi entitled, "Electronic Camera Having Non-Image Data Recorder," teaches the association of a magnetic recording area with each image for conventional film cameras. Camera parameters such as shutter speed, aperture value, frame number, location of image, and the name of the photographer for a given image can be stored in the associated magnetic recording area. The disadvantage with this camera is that, since the image is recorded on conventional film and the image related data is separately recorded in an electronic format, this configuration makes it difficult for these separate entities to be combined and be compatible with a database search and retrieval system. Indeed, Konishi does not elaborate on how such recorded data may be subsequently utilized.

There are commercially available digital cameras which allow other parameters to be recorded with the images: For example, U.S. Pat. No. 5,506,644 to Suzuki et al., entitled, "Camera", teaches the incorporation of a Global Positioning System (GPS) receiver into a camera so as to record the location at which the image was taken. Suzuki, however, does not teach recording the plurality of parameters discussed above. Suzuki also teaches electronically or magnetically storing a plurality of place names and codes associated with the place names as a hierarchical table, which allows a user to search the table to select a particular place name to be recorded with a captured image. Suzuki does not teach searching and retrieving stored images using the recorded data (i.e., the places names).

Next, U.S. Pat. No. 5,247,356 to J. Ciampa, entitled: "Method and Apparatus for Mapping and Measuring Land", teaches the association of geographical location information with each image and stores the information in unused portions of an analog image, such as the vertical blanking interval, or in the border of a digital image. Ciampa also teaches a technique to capture images of overlapping portions of a strip of land and derive the elevation of natural geographic features found in the digital image and how to measure land by accurately scaling a video image of the land. Ciampa does not teach recording the plurality of parameters with each image as discussed above, nor does Ciampa teach using the recorded parameters for searching and retrieving the images from a database.

Further, U.S. Pat. No. 5,596,494 to S. Kuo, entitled: "Method and Apparatus for Acquiring Digital Maps", discloses a method and apparatus for acquiring spatial imagery of terrestrial scenes and deriving the geophysical coordinates (latitude and longitude) of ground objects. This is accomplished with a computer-controlled camera which captures the images and records geophysical data via a GPS receiver. Various parameters such as roll, pitch, and drift angles of the camera frame are recorded with each image to correct for geometric distortion. The images along with the geophysical information is stored in a recording medium. Using this recorded data, it is possible to retrieve the latitude and longitude of any ground object. Likewise, Kuo does not teach recording the plurality of parameters discussed above (since it pertains soley to latitude and longitude) or an elaborate query system using the recorded parameters.

Next, U.S. Pat. 5,517,419 to Lanckton et al., entitled: "Advanced Terrain Mapping System", describes a system to identify and document terrain characteristics. The Lanckton system utilizes a GPS receiver to record geodite data and multiple cameras to record images. The images from a plurality of cameras provide a stereo characterization of the terrain. From these images, the system correlates image and position data for a given area of terrain and generates a database from which recorded position information relative to key terrain features may be retrieved. Again, Lanckton teaches neither recording the plurality of parameters discussed above nor an elaborate query system using the recorded parameters to retrieve images.

A digital image database having digital images with geographic data may also be utilized for providing visual directions. For instance, during in-route navigation, a person may want to specify an origin and a destination and be able to retrieve digital images (photos) of critical points such as exits, turn signs and landmarks along the specified route. In addition, a user may mark a specific route on a map in order to obtain all pictures taken along such route.

There are several commercially available map software applications which can provide the latitude and longitude of any point on the map. In addition, these map applications can show points of interest, such as hotels and restaurants, with geographic regions. With regard to road navigation, these systems can provide a turn-by-turn description for directions from one place to another. None of these systems, however, provide pictures of landmarks or critical points along a desired route so as to, e.g., assist a tourist in navigation.

SUMMARY OF THE INVENTION

The present invention is directed to system and methods for querying digital image archives containing digital photographs and/or videos (collectively, "digital images"). The digital images are indexed in accordance with a plurality of recorded parameters including time, date and geographic location data (altitude and longitude), as well as image data such as lens focal length, auto focus distance, shutter speed, exposure duration, aperture setting, frame number, image quality, flash status and light meter readings, which are used for searching a database consisting of the digital images. These images are preferably generated by an image capturing system which is capable of measuring and recording a plurality of parameters with each captured digital image. The image retrieval system allows a querying user to search the image archive by formulating one or more of a plurality of query types which are based on the recorded parameters, and then retrieve and display those images having the specified parameters.

For instance, in one aspect of the present invention, a digital image retrieval system comprises:

an image database having a plurality of digital images stored therein, each of the plurality of digital images having at least one of a plurality of parameters associated therewith;

a geographic boundary database having geographic location data corresponding to each of a plurality of geographic locations;

means for inputting at least one of a plurality of image search queries into the system;

means for retrieving from the image database, in response to a corresponding one of the plurality of image search queries which specifies at least one of the plurality of parameters, digital images having the specified parameters;

means for accessing the geographic boundary database to retrieve geographic data of a geographic location in response to a corresponding one of the plurality of image search queries which specifies the geographic location, and for retrieving, from the image database, digital images having parameters which correspond to the geographic data of the specified geographic location; and means for generating a map of a specified geographic location in response to a corresponding one of the plurality of image search queries which specifies the map of the specified geographic location and for determining geographic location data associated with one of a marked region or path on the map, and for retrieving, from the image database, digital images having parameters which correspond to the geographic location data of one of the marked region and the marked path; and means for displaying the retrieved digital images.

These and other objects, features and advantages of the present invention will become apparent from the following detailed description of illustrative embodiments, which is to be read in connection with the accompanying drawings.

DESCRIPTION OF PREFERRED EMBODIMENTS

Figure 1:
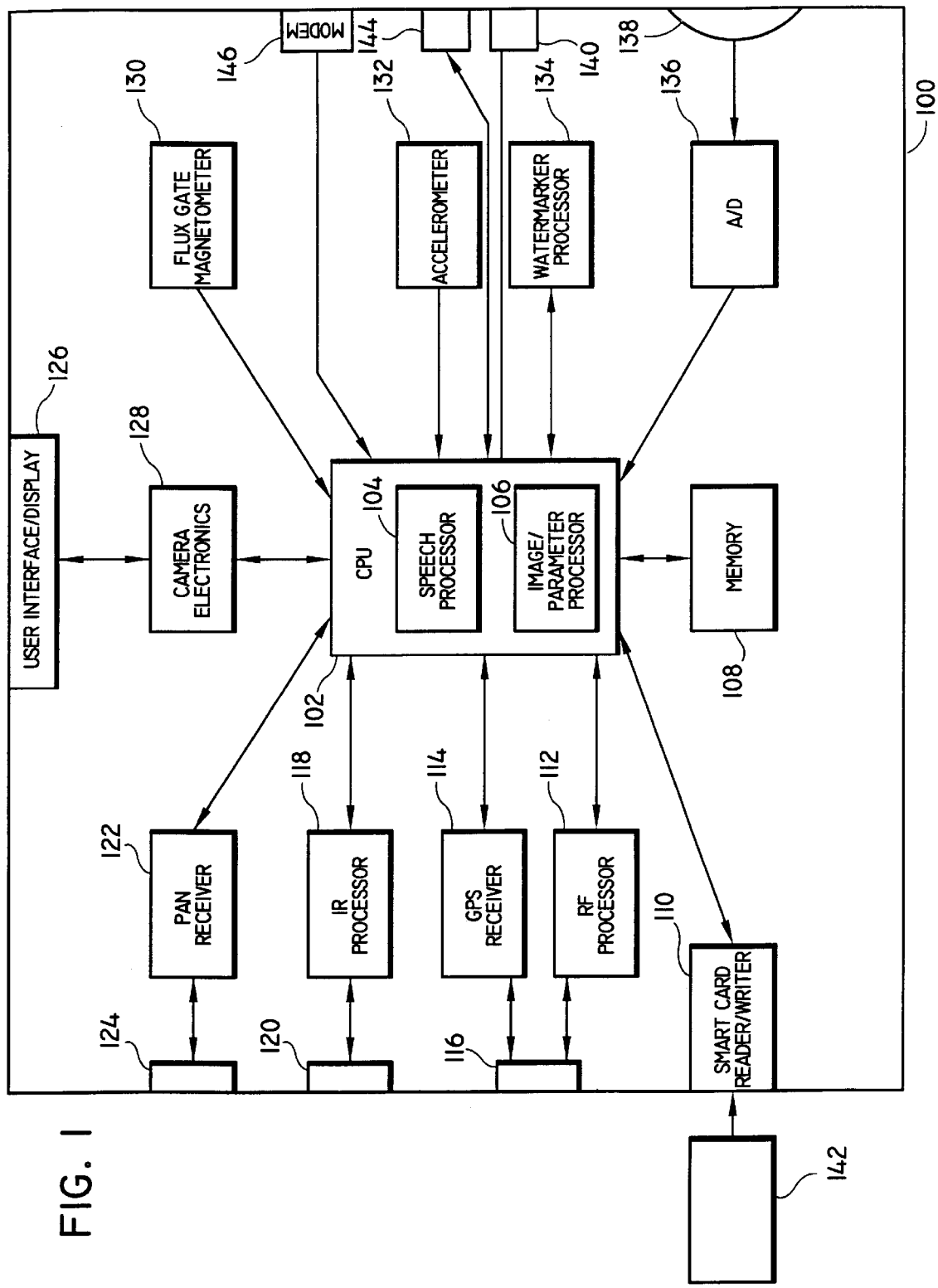
FIG. 1 is a block diagram of an image capturing system for generating digital images having a plurality of recorded parameters which may be utilized in accordance with the present invention.

Referring to FIG. 1, a block diagram of an image capturing system for generating digital images having a plurality of recorded parameters which may be utilized in accordance with the present invention. Preferably, the system 100 of FIG. 1 is a camera (which is capable of capturing still and/or video images) having conventional components such as a photographic lens and shutter, a flash, and means for receiving and converting light energy from the photographic lens into suitable electric signals and processing such signals (which are not shown). It is to be understood, however, by one of ordinary skill in the art that the system of FIG. 1 is not limited to a camera, but may be embedded in other CPU based systems such as a portable computer or any PDA device having the components (to be described below) of the system 100, as well as other conventional camera components such as a photographic lens for capturing images.

In a preferred embodiment, the camera 100 of FIG. 1, includes a central processing unit (CPU) 102 which controls the operations of the camera 100 via, e.g., programs stored in a memory 108 and executed by the CPU 102. In particular, the CPU 102 includes a speech processor module 104 for processing voice data or voice commands which are input into the camera 100 through a microphone 138. An analog to digital (A/D) converter 136 converts analog acoustic signals from the microphone 138 into digital signals for processing by the speech processor module 104. The CPU 102 also includes an image/parameter processor module 106, for recording a plurality of parameters (to be further explained below) onto digital images and for compressing the digital images using known data (image) compression techniques such as the Joint Photographic Expert Group (JPEG) coding standard. Although the illustrative embodiment herein shows the CPU 102 including the speech processor module 104 and the image/parameter processor module 106, it is to be understood that such modules may also be implemented as separate modules each having a processor, associated memory and stored programs for performing such functions.

The camera 100 includes a plurality of components which are used for generating the parameters which are recorded on the digital images and subsequently utilized (discussed in detail below) for indexing and searching an image archive. For instance, the camera 100 includes conventional camera electronic circuitry 128 for controlling and measuring various parameters such as lens focal length, auto focus distance, shutter speed, exposure duration, aperture setting, frame number, image quality (e.g., high, medium or low), flash status (e.g., on or off) and light meter readings.

In addition, a flux gate magnetometer (FGM) 130 of any conventional type is operatively connected to the CPU 102 for measuring the orientation of the principal axis of the camera 100 (in 3 dimensions). For instance, the FGM 130 provides an "image mode" parameter to indicate whether the camera 100 is in a portrait mode (vertical dimension is larger) or landscape mode (horizontal dimension is larger) mode. Alternatively, the camera 100 may include either a conventional gyroscope or compass (not shown) in lieu of the FGM 130 for determining the orientation of the camera 100. Also included is a GPS receiver 114, operatively connected between an RF port 116 (e.g., an antenna) and the CPU 102, for recording the geographic position (e.g., latitude, longitude, and altitude) of the camera 100, as well as Universal Time Coordinated (UTC) time and date and local time and date when an image is taken. It is to be appreciated that additional data such as such as the fix quality (i.e., the ability of the receiver to pick up satellite signals) and the number of satellites in view may be obtained and recorded via the GPS receiver 114. Such information may be used, e.g., to determine if the image was taken indoors or under trees or on a cloudy day. An accelerometer 132 is provided for computing the displacement of the camera 100 from its last determined position when satellite coverage is poor or while the camera 100 is indoors (i.e., the GPS signal is weak or undetectable) so that the position of the camera 100 may be accurately recorded.

The camera 100 further includes a smartcard reader/writer 110 (as is known in the art) for reading and writing information to and from various cards, e.g., magnetic cards, IC cards and/or EAROM cards (which are collectively indicated by smart card 142) using known standards and techniques. The smart card reader/writer 110 may be utilized for obtaining additional recordable parameters such as the identity of the photographer which can later be used for indexing the digital images.

A Personal Area Network (PAN) receiver 122, operatively connected between a PAN interface 124 and the CPU 102, is incorporated into the camera 100 for obtaining additional parameters using the constructions and methods disclosed by T. G. Zimmerman in the article: "Personal Area Networks (PAN): Near-Field Intra-body Communication" Proc. 4th Ann. Wireless Symposium, Feb. 12–16, 1996, Santa Clara, Calif., USA. As disclosed in the above PAN reference, information may be communicated between persons and systems via the PAN which links special electronic devices having a transceiver and CPU carried on the individuals using human conductivity. Such concept may be employed in the present invention whereby the identity of the photographer, for example, is transferred to the camera 100 upon human contact (e.g., holding the camera) when the image is taken rather than transferring such information to the camera 100 through a magnetic or smartcard or wireless communication.

The camera 100 may preferably include a radio frequency (RF) processor 112, operatively connected between the CPU 102 and the RF port 116, for processing incoming RF, as well as transmitting RF information, via the RF port 116 using conventional constructions and techniques. The device may also include an infrared (IR) processor 118 operatively connected between the CPU 102 and an IR port 120, for processing incoming optical information and for transmitting optical signals using conventional constructions and known techniques. In particular, the IR processor 118 and the RF processor 112 may be utilized for communicating with objects in a scene being photographed (assuming the objects being photographed are transmitting either RF or IR signals) so as to obtain and record information such as the name and identity of the object. In addition, the IR and RF processors can be used for transmitting (i.e., downloading) digital images from the camera 100 to a computer having IR and/or RF receivers.

These parameters (in addition to other parameters discussed below) are generated with each digital image and provided to the image/parameter processor 106 wherein they are recorded onto the digital image. These parameters are preferably recorded in a header file associated with each digital image. A user interface/display 126, operatively connected to the camera electronics 128 and the CPU 102, is preferably a liquid crystal display (LCD) touch screen display (or equivalent user interface), for allowing a user to specify (ire., choose) which of the plurality of parameters are to be recorded with the digital images (under the control of a suitable software program). The user interface/display 126 also is also utilized for displaying the "mode" of the camera 100 (i.e., the camera will keep track of which parameters should or should not be recorded at any given time). Alternatively, the interface/display 126 may be comprised of a keyboard and a conventional LCD display, which allows the user to further annotate each image with text descriptions (i.e., text parameters).

In addition, the parameters to be recorded with each image may be specified (or precluded) via voice activated commands (e.g., by stating into the microphone 138 "I want to have shutter speed recorded with the image"). Such voice commands are then received by the CPU 102 via the A/D converter 136 and processed in the speech processor module 104. It is to be appreciated that the digital images may be annotated through voice data. For instance, the name of a person being photographed can be recorded with the digital image by stating "the person being photographed is John Jones." It is to be understood that any conventional command and control engine for speech recognition may be employed in the present invention such as the commercially available large vocabulary IBM VIAVOICE GOLD system to perform the speech recognition functions in accordance with the present invention.

The following table illustrates parameters that can be recorded with each image. It is to be understood, however, that the table is not illustrative of every parameter which may be recorded, and that one of ordinary skill in the art could envision additional parameters that may be recorded and utilized in accordance with the teachings of the present invention herein.

| Field | Description string | Bytes |
|---|---|---|
| Location | Latitude (e.g. N 41 45.721), Longitude (e.g. W 76 35.420) Altitude (e.g., 1.500 E + 2 m) | 72 |
| Principal axis orientation | Azimuth (e.g., 030.12 degrees), Altitude (+20.19 degrees) | 12 |
| Camera Velocity | in m/sec or ft/sec (e.g., 1.100 E + 2 m/sec) | 8 |
| Image mode | Portrait (P) or Landscape (L) | 2 |
| Image quality | high, medium, low or other | 1 |
| Compression scheme | e.g., JPEG | 1 |
| Date | day/month/year (e.g., 12/12/1997) | 10 |
| UTC Time | hr:min:sec (e.g., 10:20:31) | 8 |
| Local Time | hr:min:sec (e.g., 10:20:31) | 8 |
| Exposure Duration | hr:min:sec (e.g., 1.000 E + 1 msec) | 8 |
| Aperture | f-stop (e.g., f11) | 2 |
| Light meter reading | lux (e.g., 1.001 E + 0 lux) | 8 |
| Flash Status | ON/OFF | 1 |
| Lens focal length | in mm (e.g., 5.000 E + 2 mm) | 8 |
| Auto focus distance | in m (e.g., 1.510 E + 2 m) | 8 |
| Frame No. | frame counter value since last reset | 4 |
| Voice annotation | ascii text | 20 |
| Photographer | ascii text | 30 |

As shown in the table, the memory required for storing the above-listed parameters amounts to a few hundred bytes (generally, at a minimum, one byte is required for each character to be stored), which is significantly less than the memory needed to store a compressed image. For instance, a 1152×864 digital image captured by the commercially available Kodak DC 210 camera and stored in JPEG format requires approximately 320 KB, so the few hundreds of bytes required for storing the camera parameters is a small fraction of the total storage required even for a highly compressed image. Consequently, the parameter data can easily be included within the image with no significant change in the storage requirements of the digital image.

Referring again to FIG. 1, the camera 100 preferably includes a serial port interface 140 and a parallel port interface 144 (utilizing known computer interface standards such as RS232 and USB), operatively coupled to the CPU 102, to provide means for establishing a communication link between the camera 100 and a server/computer (not shown) so as to, e.g., download digital images stored in memory 108 to a database within the server/computer. In addition, a modem 146 (of any conventional type) and an associated conventional telephone line interface (not shown) is included for establishing communication between the camera 100 and a remote server/computer (not shown).

The camera 100 may further include a watermarker processor 134, for watermarking the recorded parameters within each image in accordance with the methods disclosed in U.S. patent application Ser. No. 09/080,517, entitled "An Image Capturing System and Method For Automatically Watermarking Recorded Parameters For Providing Digital Image Verification", the disclosure of which is fully incorporated by reference. As discussed in the above-incorporated reference, the watermarking method allows the recorded parameters to be watermarked into every captured image, which parameters may then be later extracted and compared with the originally recorded parameters for verifying the authenticity of pictures, as well as for indexing and searching photo albums. Since the parameters are watermarked into the image, it is difficult to modify the image without affecting the watermarked data.

Figure 2:
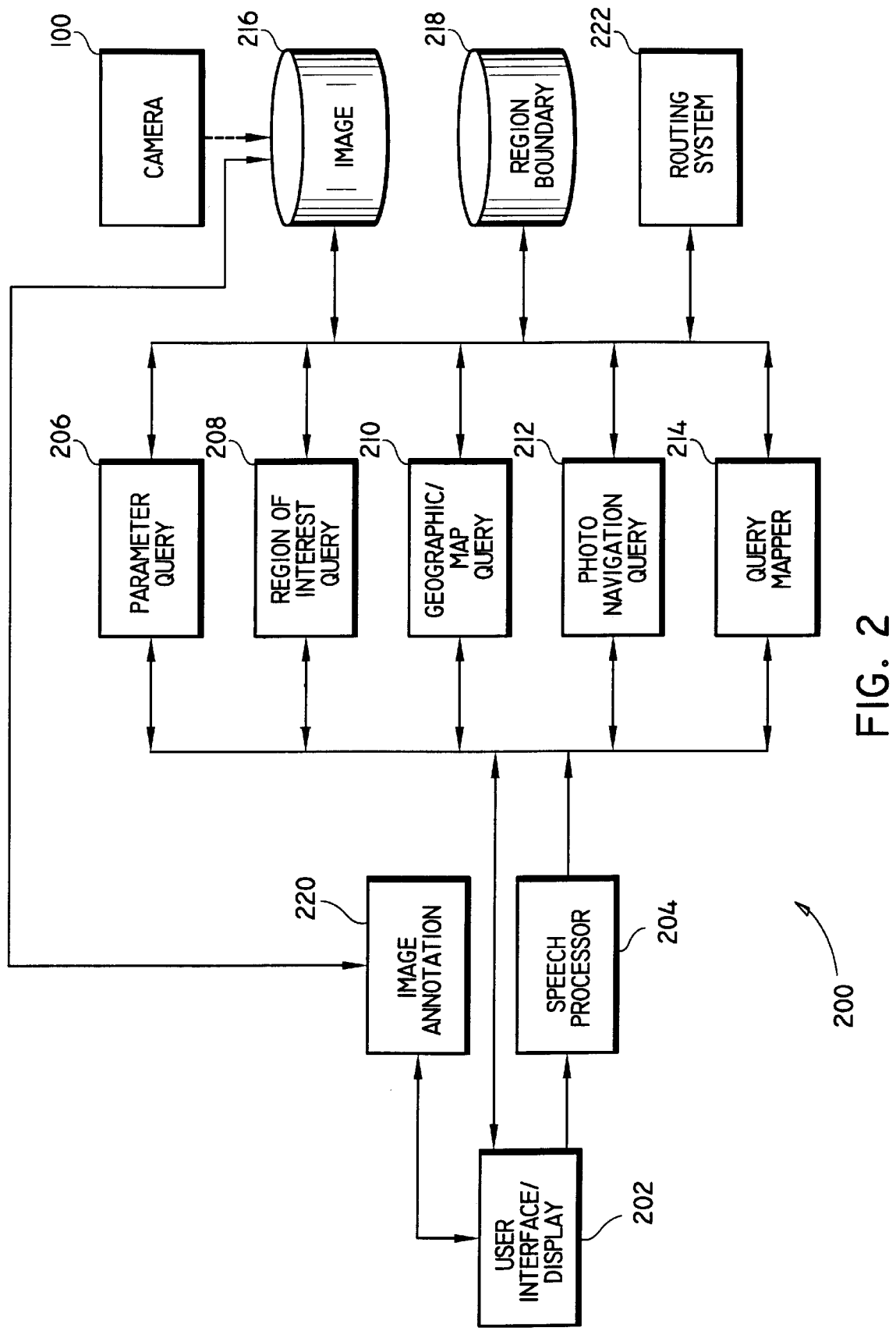
FIG. 2 is a block diagram of a system for searching digital images in an image archive having digital images with a plurality of recorded parameters in accordance with an embodiment of the present invention.

Referring now to FIG. 2, a block diagram of a system for searching digital images in an image archive having digital images with a plurality of recorded parameters in accordance with an embodiment of the present invention is shown. The image retrieval system 200 includes a user input/display 202 for inputting a query and displaying the results of such query in accordance with the present invention. It is to be understood that the user input/display 202 may be conventional devices such as a computer monitor, keyboard and mouse (or any equivalent devices). Alternatively, the input/display unit 202 may be a liquid crystal display (LCD) touch screen display (or any equivalent user interface). Furthermore, the input/display unit 202 may include a microphone (not shown) for inputting voice queries. The voice queries are processed by a speech processor 204 using any conventional speech recognition engine such as the commercially available IBM VIAVOICE GOLD engine noted above.

The system 200 includes an image database 216 (such as the IBM DB2 with image extenders) having various digital images stored therein. The digital images stored in the image database 216 may be obtained, for example, by downloading the digital images stored in the memory 108 of the image capturing device 100 (e.g., camera) either locally, via the serial interface or parallel interface as indicated above, or remotely, via the modem 142. As discussed in detail above, each at of the digital images stored in the image database 216 contain a plurality of recorded parameters (or at least one recorded parameter) which are used by the system 200 to index and retrieve certain images in response to a user query. The system also includes an image annotation module 220, operatively connected between the user interface/display 202 and the image database 216, which allows a user to retrieve digital images from the image database 216 and further annotate such digital images with additional parameters or keywords such as names and descriptions of objects in the images. In addition, the image annotation module allows a user to annotate previously existing digital images (i.e., images not generated from the image capturing system discussed above) with the parameters such as geographic location, time and date associated with each image.

The system further includes a region boundary database 218 which, as discussed in further detail below, is accessed to generate boundaries of the regions which are specified by a querying user. The region boundary database 218 may be any conventional database such as commercially available Geographic Information System (GIS) databases. In general, GIS databases may be accessed for obtaining road maps, as well as other geographically related data such as forest cover, terrain data, population density, to name a few.

The image retrieval system 200 includes a plurality of query modules which afford a querying user the capability of formulating different types of queries to accommodate specific needs of the user. In particular, the system 200 includes a parameter query module 206 which allows a querying user to perform a direct search of the images in the image database 216 by specifying one or more of the recorded parameters and retrieving the images having the specified parameters recorded thereon.

A region of interest (ROI) query module 208 is utilized in response to a user query that seeks to retrieve images corresponding to the region designated by the user. In particular, in response to a user query (as discussed further below), the ROI query module 208 will access the region boundary database 218 to determine the geographic boundaries of the designated region, and then retrieve all images within the image database 216 having parameters which fall within the determined region boundary.

The image retrieval system 200 also includes a geographic/map query module 210 for generating a map (which is displayed on the computer monitor) in response to a geographic query. As discussed further below, the querying user can mark specific regions or specific routes on the displayed map (using, e.g., a keyboard or mouse or a touch screen display). The geographic/map query module 210 will then search the image database 216 and retrieve images having parameters which correspond to the marked regions or paths.

In addition, a photo navigation query module 212 provides a querying user with photo-by-photo navigation. In particular, the photo navigation query module 212 will display a set of directions having hyperlinked text (describing certain objects such as places, landmarks, road signs and stores) which connects to the corresponding image in the image database 216, thereby allowing the querying user to visualize certain key locations prior to travel. The photo navigation query module 212 operates in conjunction with a routing system 222, which provides information relating to roads, distances and intersections in graphical structure and determines how to reach a certain destination from a given origin. The routing system 222 can be any commercially available application program such as the commercially available Delorme Street Atlas. The routing system 222 computes directions using known graph theory algorithms to determine the shortest path between a user specified origin and destination. The routing system 222 provides the photo navigation query module 212 with travel instructions (which are displayed), as well as computed data such as altitude and longitude data relating to particular roads and locations that are indicated in the travel instructions. Before the travel instructions are displayed, however, the photo navigation query module will search the image database 216 to determine if there are any digital images having recorded parameters which match the computed data received from the routing system 222. If so, the photo navigation query module will generate hyperlinked text, for example, for each of the roads, turns, intersections or locations listed in the travel directions, and then display the travel instructions with the hyperlinked text. In this manner, a querying user can then choose the hyperlinked text to retrieve images of the corresponding road, turn intersection or location. Moreover, using conventional image rendering techniques, the photo navigation query module 212 can provide a simulation of, e.g., a turn at a particular traffic light or exit by converting a panoramic image consisting of a series of digital images of a turn into a video sequence, thereby allowing the querying user to visualize the turn on the computer display.

The system 200 also includes a query mapper module 214 which translates a query in English to a set of the recorded parameters, and then searches the image database 216 for images having the recorded parameters. The functions of the above-described query modules will be explained in further detail below with reference to FIG. 3 and illustrated with specific examples.

It is to be understood that the system and methods described herein in accordance with the present invention may be implemented in various forms of hardware, software, firmware, or a combination thereof. In particular, the speech processor module 204, the parameter query module 206, the ROI query module 208, the geographic/map query module 210, the photo navigation query module 212, the query mapper module 214, the image annotation module 220 and the routing system 222 are preferably implemented in software and may include any suitable and preferred processor architecture for performing their functions by programming one or more general purpose processors. It is to be further understood that, because some of the components of the invention described herein are preferably implemented as software modules, the actual connections shown in FIG. 2 may differ depending upon the manner in which the invention is programmed. Of course, special purpose processors may be employed to implement the invention. Given the teachings of the invention herein, one of ordinary skill in the related art will be able to contemplate these and similar implementations of the elements of the invention.

Preferably, the image retrieval system 200 of the present invention is implemented on a computer platform including hardware such as one or more central processing units (CPU), a random access memory (RAM), non-volatile hard-disk memory and input/output (I/O) interface(s) (all of which are not shown). The computer platform also includes an operating system and microinstruction code. The various processes and functions described herein may be either part of the microinstruction code or application programs which are executed via the operating system. In addition, various other peripheral devices may be connected to the computer platform such as additional data storage devices and a printing device.

Alternatively, it is to be appreciated that the system 200 of the present invention may be embedded in other CPU-based systems or devices such as a personal digital assistant (PDA) and portable notebook computers. It is to be further appreciated that, since it may not be practical in certain situations to include the image database 216 and the region boundary database 218 within the above devices (due to storage limitations), the functional aspects (e.g., querying) of the present invention may be embedded in such devices, whereby such devices may then be operatively linked (via, e.g., modem) to remote servers having the desired image or boundary databases therein. Of course, one of ordinary skill may envision various alternative techniques to implement the functionality of the system 200 described above.

Figure 3:
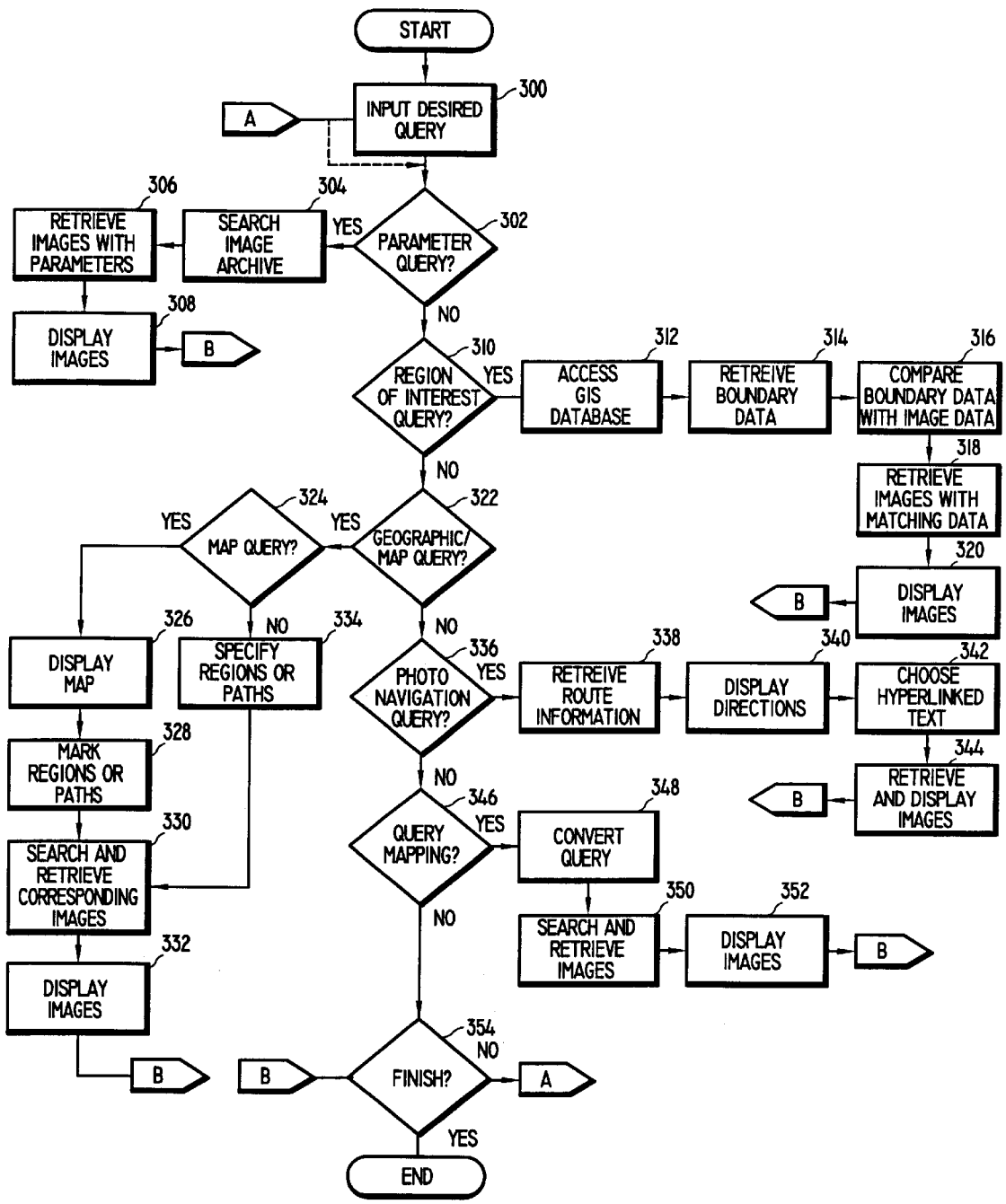
FIG. 3 is a flow diagram of a method for searching digital images having a plurality of recorded parameters in an image archive in accordance with the present invention.

Referring now to FIG. 3, a method for searching digital images in an image archive in accordance with the present invention is shown. To begin, a querying user will input a desired query into the system 200 via the input/display unit 202 (step 300). As discussed above, the query may be input via the keyboard or verbally (via the microphone and then interpreted by the speech processor module 204 ). The system 200 will make a determination of what type of query was designated based on the query input by the querying user. For instance, if it is determined that the desired query is a parameter query (affirmative result in step 302 ) (e.g., the query designates certain parameter to be searched), the parameter query module 206 will process the query. Specifically, the parameter query module 206 will search the image database 216 (step 304) and retrieve all images having the parameters designated by the query (step 306). The retrieved images will then be displayed (step 308).

It is to be appreciated that the system 200 will allow a user to designate boolean relationships in a query. For instance, a user query may designate a query with boolean OR or AND relationships, and retrieve images having the recorded parameters in accordance with these relationships (as is well-known in the art). For instance, a querying user may want to retrieve all images taken in May of 1998 BUT NOT in the week from May 10–14, 1998. Further, a querying user may specify to retrieve all images that were taken in May of 1998 AND in Florida.

Next, if it is determined that a region of interest query was designated (affirmative result in step 310) (e.g., the query designates a particular region), the ROI query module 208 will process the query. In particular, the ROI query module 208 will access the region boundary database 218 (such as the Geographic Information System (GIS) database discussed above) (step 312) and retrieve geographic boundary data for the particular region specified in the query (step 314). For example the query may designate "Yellowstone National Park" as a region of interest. The geographic boundary data (e.g., latitude and longitude) of "Yellowstone National Park" will be output from the database. The ROI query module 208 will then compare the retrieved boundary data with the location data (e.g., latitude and longitude data) associated with each of the images stored in the image database 216 (step 316). The ROI query module 208 will then retrieve every image having latitude and longitude parameters recorded thereon which fall within the string of latitude/longitude pairs of the designated boundary. It is to be appreciated that this type of query can be used for retrieving pictures that were taken, e.g., in particular cities or tourist spots. The retrieved images are then displayed to the user (step 320).

If the system 200 determines that a geographic or map query was designated (affirmative result in step 322) (e.g., a certain geographic location was specified), the geographic/map query module 210 will process the query. For instance, if a map query was specified (affirmative result in step 324), a map will be displayed for the specified geographic location (step 326). The user may then mark or highlight (via the keyboard and/or mouse) either specific regions or particular routes (paths) of interest on the displayed map of the specified geographic location (step 328). The desired region (s) could be marked by any geometric shape, e.g., squares, rectangles, circles, ellipses, polygons, or other non self-intersecting 2D shapes. In addition, the desired path(s) may be marked, for example, along a particular freeway, polyline or curve. In addition, a desired path may also be specified by choosing an origin and a destination and allowing the routing system 222 discussed above to determine a travel path between the origin and destination. The geographic/map query module 210 will then search the image database 216 and retrieve all images that were taken within the marked geographic boundary or along the path marked by the user (step 330). The retrieved images will then be displayed (step 332).

In addition, the system 200 allows the querying user to bypass the map interface whenever it is preferred (negative decision in step 324) and allow the querying user to directly specify a particular region (such as New York City) or path without marking the boundaries of the region or the particular path (step 334). This may be achieved, for example, via the keyboard by either typing the desired region or path or verbally by stating into the microphone, e.g., "Retrieve all pictures taken in New York" or "Retrieve all pictures from White Plains, New York to JFK Airport along the path of the Hutchinson Parkway to the Cross Island Parkway and the Belt Parkway".

Next, if it is determined that a photo navigation query was designated (affirmative result in step 336) (e.g., a request for photographic directions from a specified origin and destination), the photo navigation query module 212 will process the query. Initially, as discussed in detail above, the photo navigation query module 212 will access the routing system 222 to retrieve routing information corresponding the determined route (step 338). The retrieved data will then be processed by the photo navigation query module (to produce the hyperlinked text as discussed above) and directions with hyperlinked text will then be displayed (step 340). For example, assume the querying user requests directions from the International Business Machines (IBM) office in Yorktown to the IBM office in Hawthorne. The following directions may be displayed:

Get out of the parking lot at the back of the building and take a right and go past the IBM security gate. At the end of the road down the hill take a right at the stop sign. Keep going until you see signs for Taconic State Parkway South. Take a left at this point and keep going south on Taconic Parkway until you see signs for Sprain Parkway to New York City and Saw Mill Parkway to Yonkers. Bear left and take Sprain Parkway South and take the exit for 100C to Eastview. At the end of the ramp take a right towards Eastview and keep going east till you see signs for 9A. Take a right and get on to 9A North. Soon you will pass Tops Appliance City. Bear right and within 100 yards you will see signs for IBM TJ Watson Research Center Hawthorne. Take a right here and follow signs to reach the parking lot.

In the above example, each object in bold italicized text is a hyperlink which connects to an image (in the image database 216) of the object described. Consequently, the querying user may then choose a particular highlighted object (step 342), and the image of the chosen object is then retrieved and displayed (step 344) using known hyperlinking techniques, thereby providing the querying user with a visual image of critical points along the specified route.

In addition, as discussed above, hyperlinked text relating to a turn can be chosen for retrieving all images and/or video associated with the turn so that the querying user can see a computer simulation of the particular turn (using conventional image-based rendering techniques) on the computer monitor. In particular, the photo navigation query module 214 can provide a simulation of the turn at a light, intersection or exit, by converting several salient stills or panorama images of the turn into a video sequence, or by using actual video footage of the turn.

It is to be further appreciated that the textual directions may be displayed inline with thumbnail images (i.e., scaled down versions of the actual image stored in the image database), in lieu of, and in addition to, hyperlinked text. This allows a querying user to invoke a higher resolution image by activating the thumbnail image.

Referring again to FIG. 3, if it is determined that query mapping is required (affirmative result in step 346), the query mapper module 214 will process the query by converting (i.e., translating) the query to a corresponding parameters (step 348) in accordance with pre-programmed rules. In particular, the conversion rules can be programmed into the query mapper module 214 by the provider of the system 200 and subsequently tailored by a user of the system 200 to meet specific needs. Once the query is translated, the query mapper module 214 will search and retrieve the images from the image database 216 having the determined parameters (step 350).

The following examples are illustrative of various rules which may be applied for effectuating the conversion process. For example, certain queries can be converted into time ranges such that a search can be conducted of the time parameters of the images in the image database 216. In particular, the query "evening" can be translated to the time range 5pm–8pm and the query "morning" can be translated to the time range 5 am.–9am. Further, the query "sunrise" can be converted into a time range based on the date and the location of the image, since the date and location can accurately specify when sunrise has occurred.

In addition, queries based on days of the week, weekdays, weekends, seasons (fall, winter, summer, monsoon), a family member's birthday, festival days and a wedding anniversary, for example, can be converted to dates and will be compared to the date recorded with every image in the album.

Further, for queries pertaining to weather and celestial conditions, such as rain, snow, sunshine, full moons and solar eclipses, for example, the time and location of the image can be correlated and compared with archived weather or celestial event reports. The system 200 may also use facts about certain weather conditions or events such as there is/was no snow in Dallas, Tex., in the middle of summer.

In addition, there are certain queries that can be converted into latitude/longitude range queries. For example a query for images taken on "beaches" can cause the system 200 to display a list of beaches so as to allow the querying user to choose a desired beach. The system 200 can then determine the latitude/longitude parameters for the chosen beach(es) and then search the image database 216 and retrieve all images having the corresponding latitude/longitude parameters recorded thereon. Indeed, places such as stadiums, national parks, lakes, oceans, forests, volcanoes and mountain peaks, for example, can be processed in a similar manner. Moreover, a query for images of animals may be translated into a query to retrieve images taken in locations such as zoos.

Some queries can be converted to altitude ranges. For example, a query for images taken from a "plane", may translate to a query for images taken in airports, or at higher altitudes and velocities. Similarly, an image taken on a ship would be marked with a certain altitude and be within a body of water.

It is to be understood that the query mapping module 214 (i.e., the expert system with the intelligence for mapping a query in English to a subset of the recorded parameters) may either reside locally in the system 200 (as shown in FIG. 3) or reside on a server across the internet. Of course, the user will be allowed to program additional conversion rules to this system to meet his/her specific needs.

It is to be appreciated that the image retrieval system 200 of the present and the querying methods in accordance with the present invention may initially be used as a "filter" for an existing or conventional image search system. The images that are retrieved by the system 200 may then be exhaustively searched with conventional computer and object recognition techniques. For example, the results from a query search (i.e., image retrieval) performed the system 200 of the present invention may be provided to a query by content system such as Query Image By Content (QBIC), which is described in the article "Query By Image and Video Content, The QBIC System", IEEE Computer, September, 1995, Vol. 28, No. 9. The QBIC system can search an image database, for example, by matching colors, and texture of a sample image, color density and keywords. Consequently, the QBIC system would have to search a significantly smaller library.

It is to be further appreciated that a querying user may specify combinations of the querying methods described above. For instance, the querying user may specify a query to retrieve all images taken in New York City between August and November of 1997. Referring to FIG. 3, a parameter query may be performed (step 302) to retrieve images having the corresponding date parameters. After the parameter query is performed (B arrow), rather than terminating the query process (i.e., negative result in step 354), process flow returns to step 302 (via arrow A and the dotted line), and a geographic query (step 322) is performed to retrieve images taken in New York City. Then, using a boolean AND function for the retrieved images, all images taken in New York within the specified time range are displayed.

Although the illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A digital image retrieval system, comprising:
    an image database comprising a plurality of digital images, wherein the digital images are indexed in the database using a plurality of recorded parameters, and wherein each digital image comprises at least one of the plurality of recorded parameters;
    a user interface for generating at least one of a plurality of query types;
    a first query module for processing a first query type comprising an attribute that specifies at least one of the plurality of recorded parameters, wherein the first query module retrieves, from the image database, digital images having the at least one recorded parameter; and
    a second query module for processing a second query type comprising a request for photo navigation from a specified origin to a specified destination, wherein the second query module (i) retrieves, from a routing system, routing data corresponding to a route between the specified origin and destination, (ii) searches the image database for digital images having recorded parameters that correspond to the routing data and (iii) generates, from the routing data, corresponding text directions comprising hyperlinked text that links to at least one image in the database associated with the hyperlinked text.

2. The system of claim 1, wherein the second query module comprises image rendering means for providing simulation of travel along at least a portion of the route using a plurality of digital images from the database.

3. The system of claim 1, further comprising a query mapping module for converting a query comprising at least one attribute that specifies a non-recorded parameter into a query comprising at least one attribute that specifies a recorded parameter corresponding to the non-recorded parameter, based on pre-defined conversion rules.

4. The system of claim 1, further comprising:

a region boundary database;

a third query module for processing a third query type comprising a request for digital images corresponding to a specified geographic region, wherein the third query module (i) accesses the region boundary database to retrieve geographic boundary data associated with the specified geographic region and (ii) retrieves, from the image database, the digital images having recorded parameters that correspond to the retrieved geographic boundary data; and a fourth query module for processing a fourth query type comprising a request for digital images corresponding to a geographic region or route that is marked on a displayed map, wherein the fourth query module retrieves, from the image database, digital images having recorded parameters that correspond to geographic data associated with the marked geographic region or route on the map.

5. The system of claim 1, further comprising an image capturing device comprising means for generating the plurality of recorded parameters, means for generating the digital images having at least one of the recorded parameters, and means for downloading the digital images to the image database.

6. The system of claim 5 wherein the plurality of recorded parameters used for indexing and searching the image database comprise geographic location, image mode, image quality, exposure duration, aperture length, light meter reading, flash status, lens focal length, auto focus distance, frame number, information transmitted from an object captured in a digital image, time of capture of a digital image, date of capture of a digital image, orientation of the image capturing device, and an identity of a creator of a digital image.

7. The system of claim 1, further comprising a speech recognition system for processing voice queries.

8. The system of claim 1, further comprising an image annotation module for annotating a digital image in the image database with additional parameters or keywords, wherein the digital images are further indexed in the database using the additional parameters or keywords.

9. A method for retrieving digital images from an image database, comprising the steps of:

indexing digital images in the image database using a plurality of recorded parameters, wherein each digital image comprises at least one of the plurality of recorded parameters;

generating a first query type comprising an attribute that specifies at least one of the plurality of recorded parameters;

in response to the first query type, retrieving, from the image database, digital images having the at least one recorded parameter;

generating a second query type comprising a request for photo navigation from a specified origin to a specified destination; and in response to the second query type, (i) retrieving routing data corresponding to a route between the specified origin and destination, (ii) searching the image database to locate digital images having recorded parameters that correspond to the routing data and (iii) generating, from the routing data, corresponding text directions comprising hyperlinked text that links to at least one image in the database associated with the hyperlinked text.

10. The method of claim 9, further comprising the step of simulating travel along at least a portion of the route using a plurality of digital images from the database, in response to the second query type.

11. The method of claim 9, further comprising the step of converting a query comprising at least one attribute that specifies a non-recorded parameter into a query comprising at least one attribute that specifies a recorded parameter corresponding to the non-recorded parameter, based on pre-defined conversion rules.

12. The method of claim 9, further comprising the steps of:

generating a third query type comprising a request for digital images corresponding to a specified geographic region;

in response to the third query type, (i) retrieving geographic boundary data associated with the specified geographic region and (ii) retrieving, from the image database, digital images having recorded parameters that correspond to the retrieved geographic boundary data;

generating a fourth query type comprising a request for digital images corresponding to a geographic region or route on a displayed map; and in response to the fourth query type, (i) displaying a map, (ii) marking a desired geographic region or route on the displayed map, (iii) obtaining geographic data associated with the marked geographic region or route, and (iv) retrieving, from the image database, digital images having recorded parameters that correspond to the geographic data associated with the marked geographic region or route on the map.

13. The method of claim 9, wherein the plurality of recorded parameters used for indexing and searching the image database comprise geographic location, image mode, image quality, exposure duration, aperture length, light meter reading, flash status, lens focal length, auto focus distance, frame number, information transmitted from an object captured in a digital image, time of capture of a digital image, date of capture of a digital image, orientation of the image capturing device, and an identity of a creator of a digital image.

14. The method of claim 9, further comprising the step of annotating a digital image in the image database with additional parameters or keywords, wherein the digital images are further indexed in the database using the additional parameters or keywords.

15. A program storage device readable by a machine, tangibly embodying a program of instructions executable by the machine to perform method steps for retrieving digital images from an image database, the method comprising the steps of:

indexing digital images in the image database using a plurality of recorded parameters, wherein each digital image comprises at least one of the plurality of recorded parameters;

generating a first query type comprising an attribute that specifies at least one of the plurality of recorded parameters;

in response to the first query type, retrieving, from the image database, digital images having the at least one recorded parameter;

generating a second query type comprising a request for photo navigation from a specified origin to a specified destination; and in response to the second query type, (i) retrieving routing data corresponding to a route between the specified origin and destination, (ii) searching the image database to locate digital images having recorded parameters that correspond to the routing data and (iii) generating, from the routing data, corresponding text directions comprising hyperlinked text that links to at least one image in the database associated with the hyperlinked text.

16. The program storage device of claim 15, further comprising instructions for performing the step of simulating travel along at least a portion of the route using a plurality of digital images from the database, in response to the second query type.

17. The program storage device of claim 15, further comprising instructions for performing the step of converting a query comprising at least one attribute that specifies a non-recorded parameter into a query comprising at least one attribute that specifies a recorded parameter corresponding to the non-recorded parameter, based on pre-defined conversion rules.

18. The program storage device of claim 15, further comprising instructions for performing the steps of:

generating a third query type comprising a request for digital images corresponding to a specified geographic region;

in response to the third query type, (i) retrieving geographic boundary data associated with the specified geographic region and (ii) retrieving, from the image database, digital images having recorded parameters that correspond to the retrieved geographic boundary data;

generating a fourth query type comprising a request for digital images corresponding to a geographic region or route on a displayed map; and in response to the fourth query type, (i) displaying a map, (ii) marking a desired geographic region or route on the displayed map, (iii) obtaining geographic data associated with the marked geographic region or route, and (iv) retrieving, from the image database, digital images having recorded parameters that correspond to the geographic data associated with the marked geographic region or route on the map.

19. The program storage device of claim 15, wherein the plurality of recorded parameters used for indexing and searching the image database comprise geographic location, image mode, image quality, exposure duration, aperture length, light meter reading, flash status, lens focal length, auto focus distance, frame number, information transmitted from an object captured in a digital image, time of capture of a digital image, date of capture of a digital image, orientation of the image capturing device, and an identity of a creator of a digital image.

* * * * *